Nov. 22, 1966   O. J. RILEY   3,286,537
POTTER'S WHEEL HAVING A VARIABLE SPEED POWER
TRANSMISSION SYSTEM
Filed Aug. 24, 1964   2 Sheets-Sheet 1

INVENTOR.
OSCAR J. RILEY
BY
Roman A. Dines
ATTORNEY

INVENTOR.
OSCAR J. RILEY
BY
ATTORNEY

United States Patent Office 3,286,537
Patented Nov. 22, 1966

3,286,537
POTTER'S WHEEL HAVING A VARIABLE SPEED POWER TRANSMISSION SYSTEM
Oscar J. Riley, San Gabriel, Calif., assignor to Oscar-Paul Corporation, Los Angeles, Calif., a corporation of California
Filed Aug. 24, 1964, Ser. No. 391,702
20 Claims. (Cl. 74—193)

This invention relates generally to a variable speed power transmission system having a constant power output at every speed.

More particularly, the invention concerns a variable speed power transmission system utilizing cone rollers. The invention finds particular usefulness where a uniform power output is required upon the application of a load to the system regardless of the operating speed, for example, in a rotating potter's wheel. In such fields as pottery making by manual means, it is essential that during the contouring and forming of the pottery object the speed is maintained as uniform as possible, particularly upon the application of a load on the potter's wheel.

Heretofore, power transmission systems utilizing cone rollers and intermediate drive means were subject to a drop in power output whenever a load was applied to the system, thereby causing a decrease in speed or "drag" of the driven portion of the system. Because of a certain amount of slippage in the prior systems, excessive vibration or "chatter" would be produced, as well as result in a non-uniform speed at a particular preset position. In addition, the intermediate drive means would tend to shift or "drift" from their set positions.

The present invention significantly differs from all prior variable speed power transmission means using cone rollers and intermediate drive means, in that the said intermediate drive means is comprised of a friction wheel which is canted so that the friction wheel will rotate in a plane normal to the axis of the cones and which has a crown on the peripheral face thereof. The friction wheel may be composed of urethane or some other like substance and is rotatably mounted in a clevis which is slidably connected to a traverse rod as will hereinafter be described.

Although the friction wheel is mounted substantially normal to the surfaces of the cones, the wheel is canted or rotated about the longitudinal axis of the clevis, so that approximately one-half of the peripheral face of the wheel will be in circumferential contact with one cone surface and the other one-half of the peripheral face of the wheel will be in circumferential contact with the other cone surface.

Canting of the friction wheel avoids tearing or distortion thereof, as well as prevents it from shifting or "drifting" when it is set to operate at a particular speed. In addition, detrimental vibration and "chatter" is avoided while the system is in operation.

Although canting the friction wheel at an angle of approximately 10 degrees from a plane perpendicular to the axis of the traverse rod has been found to give optimum results, any degree of cant may be utilized provided the angle does not exceed approximately 15 degrees. In any event, regardless of the angle of cant selected, it is important that the angle of the taper of the crown on the friction wheel be the same as the angle of cant. If any difference exists, in the respective angles, the friction wheel will tend to shift or "drift" from its set position.

The friction wheel is maintained in constant contact with the cone surfaces by means of a compression spring positioned between the clevis and the guide bushing secured to the traverse rod and automatically compensates for any wear which might occur to the friction wheel or cone surfaces. Further, upon the application of a heavy load to the system, the coaction of the compression force of the spring and the cant and crown of the friction wheel, causes said wheel to be more deeply disposed in the gap between the cones, thereby increasing frictional contact between the wheels and the cones so as to maintain a constant power output. Thus, the friction wheel always operates at a maximum efficiency.

The clevis is mounted on the traverse rod so that it is capable of limited rotation about the axis of said rod thereby automatically maintaining the friction wheel in positive contact with the cone surfaces.

Another unique feature of the present invention is that the diameter of the base of the driver cone is equal to the diameter of the truncated end of the driven cone and is positioned adjacent thereto. The diameter of the base of the driven cone which lies adjacent the truncated end of the driver cone is four times as large as the diameter of the aforesaid truncated end of the driver cone. Thus, the rotational speed of the driven cone relative to the driver cone may be varied from a ratio of 1:1 to 4:1. Although a 4:1 maximum ratio is described herein, it should be understood that for optimum effect, this ratio may be of any value provided it is greater than the ratio of the base of the driver cone relative to the truncated end of the driven cone which is positioned adjacent thereto, and the ratio of the diameter of the truncated end of the driver cone to the diameter of the base thereof is equal to the ratio of the diameter of the truncated end of the driven cone to the diameter of the base thereof.

The diameters of the cones and the relative positions provide further advantages over heretofore known variable power transmission systems utilizing cone rollers. Since, in the instant transmission system, the input power into the system is constant when the friction wheel engages the base of the driver cone and the truncated end of the driven cone, the driven cone will rotate at its maximum speed since it is in a 1:1 ratio. Thus, the work output is substantially the same as the work input. When the friction wheel is at the opposite ends of the cones, the driven cone is operating at its minimum speed. However, because of the multiplying factor at this end (i.e. 4:1) the work output by the driven cone is the same as it is when the driven cone is at its maximum speed.

The simplicity of the variable power transmission system herein provides for a minimum of working parts and reduces maintenance and cleaning problems.

Accordingly, the principal object of the invention is to provide a variable speed transmission system having a constant power output at every speed.

Another object is to provide a variable speed transmission system having constant speed at any set position without the aid of locks or pins.

Still another object is to provide a variable speed transmission system having self-adjusting means to provide positive contact between the power transmission elements, notwithstanding wear of said elements and load on the system.

Another object is to provide a variable speed power transmission system having self-adjusting means capable of maintaining constant positive contact between the power transmission elements, notwithstanding the rotational movement of the elements of the system.

Still another object is to provide a variable speed power transmission system which is free from vibration and noise and is extremely simple to maintain and clean.

A further object is to provide a variable speed potter's wheel having a constant power output at every speed.

Another object is to provide a variable speed potter's wheel having a constant speed at every set position.

Still another object is to provide a variable speed potter's wheel which is vibrationless and extremely noiseless in operation.

A further object is to provide a variable speed potter's wheel having a power transmission system which is simple to clean and maintain.

Other objects and advantages of the invention will become apparent from the following description taken in conjunction with the accompanying drawings.

Figure 1:
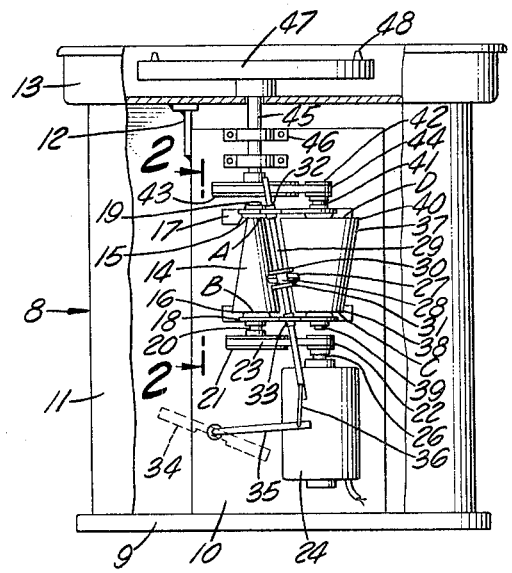
FIG. 1 is a greatly reduced elevational view of the potter's wheel embodying the principles of the present invention partly sectioned to show the variable speed power transmission system.

Referring more particularly to FIG. 1, numeral 8 designates generally a potter's wheel having a horizontal base 9 and a vertical base 10. Cover shell 11 is removably secured to base 9 and, together with brace 12, supports splash pan 13.

The power transmission system is comprised of a driver cone 14 having a diameter A at its truncated end 15 and a diameter B at its base 16. Driver cone 14 is rotatably mounted on horizontal frame supports 17 and 18 by shafts 19 and 20, respectively. Shaft 20 is connected to pulley wheel 21, the latter being actuated by the engagement of a second pulley wheel 22 with pulley belt 23. Input power to the system is provided by motor means 24 or the like which interconnects pulley wheel 22 by shaft 26.

Figure 5:
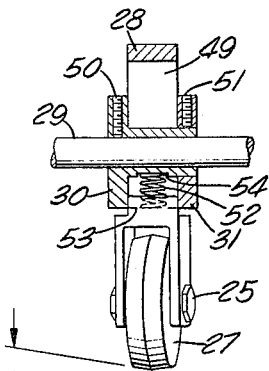
FIG. 5 is an elevational view of the friction wheel and clevis, partly in section, illustrating the crown of the wheel periphery and the means of mounting the clevis on the transverse rod.
Figure 2:
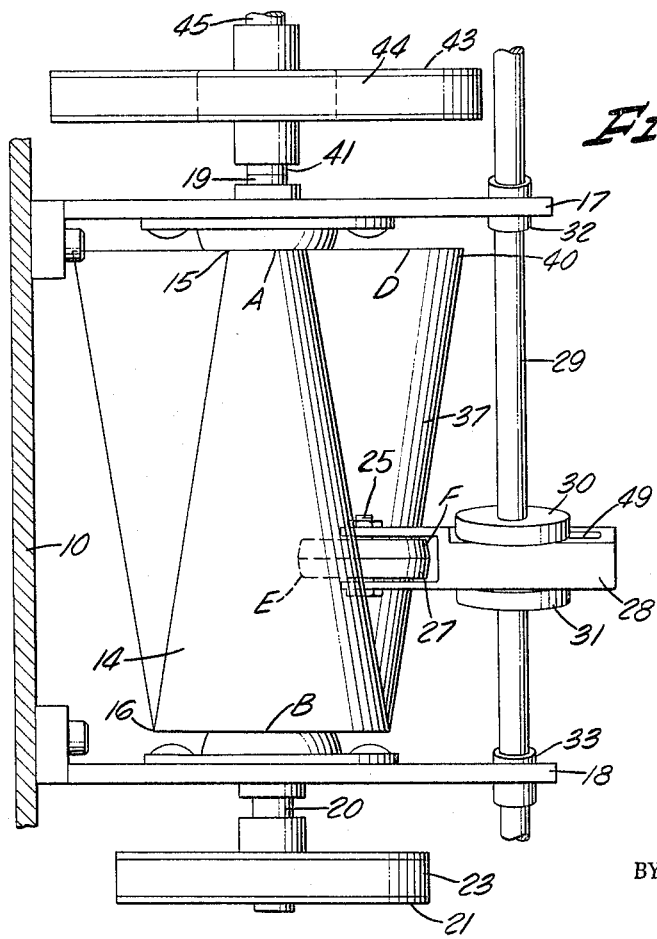
FIG. 2 is a greatly reduced elevational side view of the variable speed transmission system taken on the line 2—2 of FIG. 1.

Friction wheel 27 is rotatably secured to clevis 28 by bolt axle 25 (best shown in FIGS. 2 and 5). Clevis 28 is slidably connected to traverse rod 29 by means of guide bushing 30 and guide cap 31 so that movement of the clevis is permitted in a plane normal to the traverse rod axis, as will hereinafter be more fully described. Traverse rod 29 is slidably engaged with frame supports 17 and 18 by bushings 32 and 33, respectively.

Rod 29 is actuated in a plane parallel to the axis of driver cone 14 by treadle means 34. Whenever it is desired to change the output speed of the system, treadle means 34 are activated so as to rotate actuating rod 35 which is secured to the treadle means and journaled in vertical base 10. Actuating rod 35 is rotated in a plane parallel to the traverse rod 29 by means of a connecting link 36 which is pivotally secured to both the traverse rod 29 and the actuating rod 35.

Driven cone 37 has a truncated end 38 having a diameter C which is rotatably secured to frame support 18 by shaft 39. Diameter C of end 38 of driven cone 37 is equal to diameter B of base 16 of driver cone 14 so that the ratio of the ends 16 and 38 of the respective cones is 1:1.

The opposite or base end 40 of driven cone 37 is journalled to frame support 17 by shaft 41 and has a diameter D. Diameter D of the base end 40 of driven cone 37 is four times greated than diameter B of the truncated end 15 of driver cone 14 so that end 40 of driven cone 37 is four times greater than diameter B of the truncated hereinbefore mentioned, it should be understood that ends 15 and 40 of driver cone 14 and driven cone 37, respectively, can longitudinally extend to any dimension consistent with efficient design, and the ratio of the driven cone relative to the driver cone at this end may be of any value, provided that it is greater than the ratio of end 16 to end 38 and that the ratio of diameter A to diameter B is equal to the ratio of diameter C to diameter D.

Pulley wheel 42 is secured to end 40 of driven cone 37 by shaft 41 and actuates a second pulley wheel 43 by means of pulley belt 44. Spindle 45 is journalled to vertical base 10 by bushings 46 and interconnects pulley wheel 43 at one end and wheelhead 47 at the other end. Wheelhead 47 is generally circular in configuration and can be provided with indexing pins 48 to center the material (i.e. clay) to be molded or shaped.

FIG. 2 is an elevational side view of the variable speed power transmission system illustrating the relationship of the traverse rod 29 and the friction wheel assembly to driver cone 14 and driven cone 37. It should be noted that the traverse rod 29 is slidably movable in a plane parallel to the axis of the cones 14 and 37 and to the vertical base 10 regardless of the various locations of the friction wheel 27 when set at different speeds.

FIG. 2 also shows the slidable connection of clevis 27 to traverse rod 29. Traverse rod 29 is passed through elongated aperture 49 and is provided with guide bushing 30 and guide cap 31 which are securely attached to traverse rod 29 to prevent axial shifting or "drifting" of clevis 28 relative to the rod. Elongated slot 49 permits lateral movement of the clevis 28 and friction wheel 27, and limited rotational movement thereof, in a plane perpendicular to traverse rod 29 so that the friction wheel 27 can be automatically self-adjusting to maintain constant positive contact with the surfaces of the cones.

It should also be noted that during normal operation friction wheel 27 is positioned in the gap between driver cone 14 and driven cone 37, so that the respective cone surfaces are in contact with the friction wheel above a plane passing through the axes of the cones. As hereinbefore described, upon the application of a heavy load or "drag" to the driven cone 37, friction wheel 27 will be further displaced into the gap between the cones by compression spring means (not shown) so that constant contact is maintained with the cone surfaces. If the cones were spaced so that the gap therebetween accommodated the friction wheel directly between the cones, it should be obvious that the friction wheel could not be self-adjusting so as to automatically compensate for wear of the wheel or in the event a heavy load is applied to the driven cone.

Figure 3:
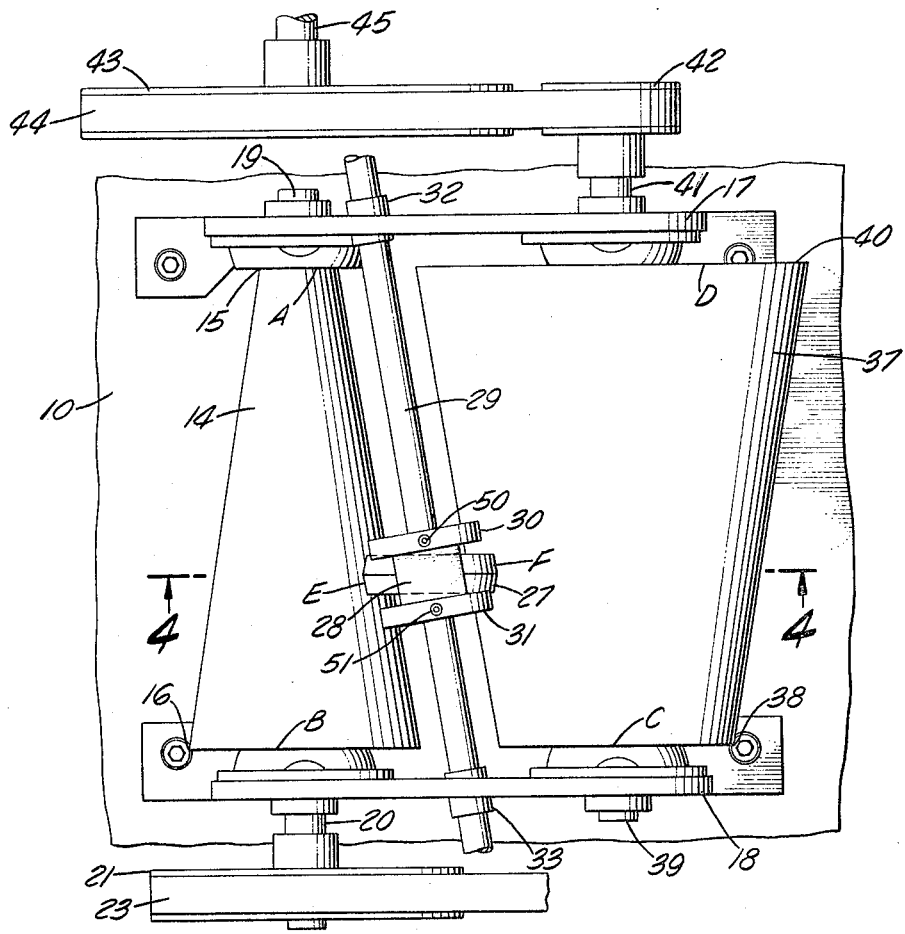
FIG. 3 is a greatly reduced elevational front view of the variable speed power transmission system.

FIG. 3 is an elevational front view of the variable speed power transmission system further illustrating the relationship of the traverse rod 29 and friction wheel assembly to the driver cone 14 and driven cone 37. In this view, it can be seen that traverse rod 29 bisects the gap between driver cone 14 and driven cone 37 and also clearly shows the cant of friction wheel 27 with respect to traverse rod 39 and the respective surfaces of the cones. In addition, the crown of friction wheel 27 is clearly illustrated. As shown, and as hereinbefore described, during the operation of the system, the peripheral half E of friction wheel 27 is in contact with the surface of cone 14 whereas peripheral half F is in contact with the surface of driven cone 37. Guide bushing 30 and guide cap 31 which prevent axial drifting of the clevis 28 and friction wheel 27 along traverse rod 29 are here shown maintained securely attached to the traverse rod 29 by means of set screws 50 and 51, respectively.

Figure 4:
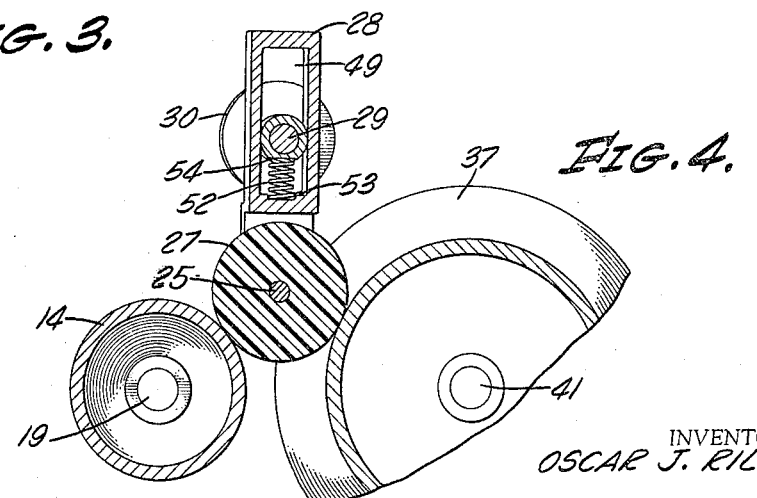
FIG. 4 is a sectional view of the clevis and friction wheel illustrated in engagement with the driver and driven cones taken on the line 4—4 of FIG. 3.

FIG. 4 is a sectional view of the friction wheel 27 and clevis 28 mounted on the traverse rod 29 taken on line 4—4 of FIG. 3 illustrating the relationship of spring means 52 with respect to clevis 28 and traverse rod 29. Compression spring means 52 are positioned in elongated slot 49 and is mounted with one end seated on abutment surface 53 at one end of elongated slot 49 and the other end of spring 52 is accommodated in recess 54 contained in guide bushing 30 which is secured to traverse rod 29. Compression spring 52, coacting between the abutment surface 53 of elongated slot 49 and guide bushing 30 secured to traverse rod 29, forces clevis 28, and concomitantly friction wheel 27, towards the respective surfaces of driver cone 14 and driven cone 37. It is evident from this assembly that a "floating" effect results permitting displacement of the clevis and friction wheel in a direction normal to the axis of the rod, and also permits slight rotational movement of the friction wheel assembly relative to said rod so as to be automatically self-adjusting.

FIG. 5 is another view of the friction wheel assembly showing a sectional view of the guide bushing 30 and guide cap 31 and also a sectional view of the clevis 28 in the region of the elongated aperture 49. This view again illustrates the relationship of compression spring means 52 with respect to traverse rod 29 and clevis 28. This view also shows the securement of guide bushing 30 to traverse rod 29 by means of set screw 50 and guide cap 31 to guide bushing 50 by means of set screw 51. The crown of the peripheral face of friction wheel 27 has an angle of taper designated X.

Figure 6:
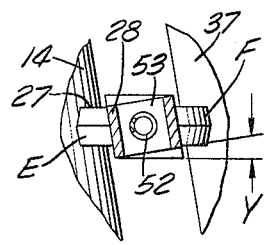
FIG. 6 is a sectional plan view of the clevis and friction wheel showing the angle of cant of the wheel relative to the axis of the cone and traverse rod.

In FIG. 6, a top view is shown of the clevis and friction wheel assembly in relation to the surfaces of driver cone 14 and driven cone 37, respectively, similar to that illustrated in FIG. 3, except that the clevis 28 is sectioned through the elongated aperture 49 and the guide bushings 30 and guide cap 31 are omitted. FIG. 6 again clearly illustrates the tapering crown of the friction wheel 27 and also clearly shows the angle of cant Y of the friction wheel with respect to the axis of traverse rod 39 and the surfaces of the respective cones. As hereinbefore described, the angle of taper of the crown X must equal the angle of cant of the friction wheel Y in order to prohibit shifting or "drifting" of the friction wheel from its set position.

From the foregoing description, it is thus simple to follow the operation of the system. Power input into the system is provided by motor means 24 which rotates pulley wheel 22 by interconnected shaft 26 and simultaneously pulley wheel 21 by means of belt pulley 23. Driver cone 14 is thus activated by connecting shaft 18 and drives friction wheel 27 which is maintained in constant contact therewith by virtue of compression spring 52 positioned between guide bushing 50 carried by traverse rod 29 and abutment surface 53 located at one end of elongated aperture 49. The rotational force applied to the frictional wheel 27 is transmitted to driven cone 37 which in turn rotates pulley wheel 42 connected thereto by shaft 41. Pulley wheel 43 is simultaneously activated by pulley belt 44 which engages pulley wheel 42 thereby rotating spindle 45 and wheelhead 47 connected to the said spindle. When it is desired to change the speed of the system, a force is applied to treadle 34 which in turn will activate actuating rod 35 interconnected to traverse rod 29 by connecting link 36. Traverse rod 29, and concomitantly the friction wheel assembly (i.e. friction wheel 27 and clevis 28), is longitudinally motivated in a plane parallel to the axes of the cones and in a plane bisecting the gap between the aforesaid cones.

While one embodiment of the invention and its operation has been described, it is of course understood that a particular embodiment of the invention herein disclosed is for illustrative purposes only and that various changes may be made therein without departing from the principles of the invention or the scope of the annexed claims.

What is claimed is:

1. A variable speed power transmission system comprising: a base; a driver cone rotatably secured to said base; a driven cone rotatably secured to said base spaced from said driver cone, said driven cone being inversely positioned adjacent said driver cone; shifting means slidably secured to said base; intermediate wheel means slidably attached to said shifting means, said intermediate wheel means simultaneously engaging the surface of said driver cone and said driven cone, said intermediate wheel means being canted so as to rotate in a plane inclined relative to the respective surface of each of said cones; spring means positioned between said intermediate wheel means and said shifting means so as to maintain said intermediate wheel means in constant simultaneous contact with said surfaces of said cones; means connected to said driver cone to provide rotational power to said driver cone; and means connected to said driven cone to transmit power from said driven cone.

2. A variable speed power transmission system as described in claim 1, wherein the axes of the driver cone and driven cone are in the same plane and the respective surfaces of the cones at their position of closest association to each other are parallel, and wherein the driver cone and driven cone are truncated and wherein the diameter of the larger end of the driven cone is greater than the diameter of the truncated end of the driver cone adjacent thereto and the diameter of the truncated end of the driven cone is equal to the diameter of the adjacent larger end of the driver cone.

3. A variable speed power transmission system as described in claim 1, wherein the shifting means is comprised of a traverse rod slidable in a plane parallel to the axes of the cones and which is pivotally attached to actuating means whereby force is provided to vary the position of the rod along the direction of its axis.

4. A variable speed power transmission system as described in claim 3, wherein the driver cone and driven cone are truncated and wherein the diameter of the larger end of the driven cone is greater than the diameter of the truncated end of the driver cone adjacent thereto and the diameter of the truncated end of the driven cone is equal to the diameter of the adjacent larger end of the driver cone, and wherein the axes of the driver cone and driven cone are in the same plane and the respective surfaces of the cones at their position of closest association to each other are parallel.

5. A variable speed power transmission system as described in claim 3, wherein the traverse rod is positioned so that the axis thereof bisects the gap between the driver cone and the driven cone and is provided with a guide bushing and guide cap secured thereto so as to prohibit movement of the intermediate wheel means in an axial direction relative to the traverse rod, yet permitting lateral and rotational movement of the intermediate wheel means in a plane normal to the traverse rod axis.

6. A variable speed power transmission system as described in claim 3, wherein the traverse rod is positioned so that the axis thereof bisects the gap between the driver and driven cones and is provided with a guide bushing and guide cap secured thereto so as to prohibit movement of the intermediate wheel means in an axial direction relative to the traverse rod, yet permitting lateral and rotational movement of the intermediate wheel means in a plane normal to the traverse rod axis, and wherein the driver cone and driven cone are truncated and the diameter of the larger end of the driven cone is greater than the diameter of the truncated end of the driver cone adjacent thereto and the diameter of the truncated end of the driven cone is equal to the diameter of the adjacent larger end of the driver cone.

7. A variable speed power transmission system as described in claim 1, wherein the intermediate wheel means is comprised of a friction wheel rotatably mounted in an elongated clevis, said clevis being slidably attached to said shifting means so as to be movable in a plane normal thereto, the yoke portion of said clevis attached to said friction wheel being canted at an angle relative to the respective surfaces of each cone.

8. A variable speed power transmission system as described in claim 7, wherein the peripheral face of the friction wheel has a greater diameter at the center thereof and uniformly tapers to a lesser diameter at the edges of said face, the angle of each taper of said peripheral face being equal to the angle of cant of the clevis yoke.

9. A variable speed power transmission system as described in claim 7, wherein the clevis is provided with an elongated aperture through which the traverse rod extends and the spring means are contained in said aperture abutting against a guide bushing secured to the traverse rod and the abutment face provided by the bottom wall of the aperture.

10. A variable speed power transmission system as described in claim 7, wherein the peripheral face of the friction wheel has a greater diameter at the center thereof and uniformly tapers to a lesser diameter at the edges of said face, the angle of each taper of said peripheral face being equal to the angle of cant of the clevis yoke and wherein the clevis is provided with an elongated aperture through which the traverse rod extends and the spring means are contained in said aperture abutting against a guide bushing secured to the traverse rod and the abutment face provided by the bottom wall of the aperture.

11. A variable speed power transmission system comprising: a base; a driver cone rotatably secured to said base, said driver cone having a truncated apex; a driven cone rotatably secured to said base and spaced from said driver cone, said driven cone being inversely positioned adjacent said driver cone, the diameter of the larger end of said driven cone being greater than the truncated apex of said driver cone adjacent thereto, said driven cone having a truncated apex, said driven cone having the diameter of the truncated apex thereof equal to the diameter of said larger end of said adjacent driver cone, said driven cone having the axis thereof in the same plane as the axis of said driver cone, said driven cone having the surface thereof at the position of closest association to the surface of said driver cone parallel thereto; shifting means, said shifting means having a traverse rod slidably connected to said base and in a plane parallel to said cone axes, said traverse rod being positioned so that the axis thereof bisects the gap between said driver cone and said driven cone, said traverse rod having a guide bushing and guide cap secured thereto; intermediate wheel means, said intermediate wheel means having a frictional wheel simultaneously engaging the surface of said driver cone and said driven cone, the peripheral face of said friction wheel having a greater diameter at the center thereof and tapering to a lesser diameter at the edges of said face; actuating means pivotally attached to said traverse rod so that a force may be applied thereto whereby the position of said traverse rod may be varied along the direction of its axis; clevis means provided with an elongated head and a yoke, said elongated head having an elongated aperture and being slidably secured therewith to said traverse rod of said shifting means in a plane normal thereto, said elongated head being slidably accommodated by said guide bushing and said guide cap, said yoke of said clevis having said friction wheel rotationally mounted therein, said yoke being canted at an angle so that said friction wheel will rotate in a plane normal to the axes of said cones, the angle of cant of said clevis yoke being equal to said angle of taper of said peripheral face of said friction wheel; spring means accommodated in said elongated aperture provided by said clevis head, said spring means having one end thereof abutting against said guide bushing secured to said traverse rod provided by said shifting means and the other end thereof abutting against an abutment face provided by the bottom wall of said elongated aperture thereby maintaining said intermediate wheel means in constant simultaneous contact with said surfaces of said cones; means connected to said driver cone to provide rotational power to said driver cone; and means connected to said driven cones to transmit rotational power from said driven cone.

12. A variable speed power transmission system comprising: a base; a driver cone rotatably secured to said base, said driver cone having a truncated apex; a driven cone rotatably secured to said base and spaced from said driver cone, said driven cone being inversely positioned adjacent said driver cone, the diameter of the base of said driven cone being greater than the truncated apex of said driver cone adjacent thereto, said driven cone having a truncated apex, said driven cone having the diameter of the truncated apex thereof equal to the diameter of said adjacent driver cone base; a friction wheel positioned in the gap between said cones, said friction wheel simultaneously engaging the surfaces of said cones, the peripheral face of said friction wheel having a greater diameter at the center thereof and tapering to a lesser diameter at the edges of said face; a traverse rod, said traverse rod being slidably connected to said base and in a plane parallel to the axes of said cones, said traverse rod being positioned so that the axis thereof bisects the gap between said driver cone and said driven cone, said traverse rod having a guide bushing and guide cap secured thereto; actuating means pivotally attached to said traverse rod so that a force may be applied thereto whereby the position of said traverse rod may be varied along the direction of its axis; a clevis having an elongated head and yoke, said elongated head having an elongated aperture and being slidably secured therewith to said traverse rod in a plane normal thereto, said elongated head being slidably accommodated by said guide bushing and said guide cap, said yoke of said clevis having said friction wheel rotatably mounted therein, said yoke being canted at an angle so that said friction wheel will rotate in a plane normal to the axes of said cones, the angle of cant of said clevis yoke being equal to said angle of taper of said peripheral face of said friction wheel; a compression spring accommodated in said elongated aperture provided by said clevis head, said spring having one end thereof abutting against said guide bushing secured to said traverse rod and the other end thereof abutting against an abutment face provided by the bottom wall of said elongated aperture thereby maintaining said friction wheel in constant simultaneous contact with said surfaces of said cones; means connected to said driver cone to provide rotational power to said driver cone; and means connected to said driven cones to transmit rotational power from said driven cone.

13. In a variable speed potter's wheel, the combination comprising: a horizontal base; a vertical base secured to said horizontal base; a driver cone rotatably secured to said vertical base; a driven cone rotatably secured to said vertical base spaced from said driver cone, said driven cone being inversely positioned adjacent said driver cone; shifting means slidably secured to said vertical base; intermediate wheel means slidably attached to said shifting means, said intermediate wheel means simultaneously engaging the surface of said driver cone and said driven cone, said intermediate wheel means being canted so as to rotate in a plane inclined relative to the respective surface of each of said cones; spring means positioned between said intermediate wheel means and said shifting means to maintain said intermediate wheel means in constant simultaneous contact with said surfaces of said cones; means connected to said driver cone to provide rotational power to said driver cone; and a rotatable wheelhead operatively connected to said driven cone.

14. In a variable speed potter's wheel, the combination as described in claim 13, wherein the shifting means is comprised of a traverse rod slidable in a plane parallel to the axes of the cones and which is pivotally attached to actuating means whereby force is provided to vary the position of the rod along the direction of its axis.

15. In a variable speed potter's wheel, the combination as described in claim 14, wherein the driver cone and driven cone are truncated and wherein the diameter of the base of the driven cone is greater than the diameter of the truncated end of the driver cone adjacent thereto and the diameter of the truncated end of the driven cone is equal to the diameter of the adjacent driver cone base, and wherein the axes of the driver cone and driven cone are in the same plane and the respective surfaces of the cones at their position of closest association to each other are parallel.

16. In a variable speed potter's wheel, the combination as described in claim 13, wherein the intermediate wheel means is comprised of a friction wheel rotatably mounted in an elongated clevis, said clevis being slidably attached to said shifting means to as to be movable in a plane normal thereto, the yoke portion of said clevis attached to said wheel being canted at an angle relative to the respective surfaces of each cone.

17. In a variable speed potter's wheel, the combination as described in claim 16, wherein the peripheral face of the friction wheel has a greater diameter at the center thereof and uniformly tapers to a lesser diameter at the edges of said face, the angle of each taper of said peripheral face being equal to the angle of cant of the clevis yoke.

18. In a variable speed potter's wheel, the combination as described in claim 16, wherein the clevis is provided with an elongated aperture through which the traverse rod extends and the spring means are contained in said aperture abutting against the guide bushing secured to the traverse rod and the abutment face provided by the bottom wall of the aperture.

19. In a variable speed potter's wheel, the combination comprising: a horizontal base; a vertical base secured to said horizontal base; a driver cone rotatably secured to said vertical base, said driver cone having a truncated apex; a driven cone rotatably secured to said vertical base and spaced from said driver cone, said driven cone being inversely positioned adjacent said driver cone, the diameter of the larger end of said driven cone being greater than the truncated apex of said driver cone adjacent thereto, said driven cone having a truncated apex, said driven cone having the diameter of the truncated apex thereof equal to the diameter of said adjacent larger end of said driver cone; said driven cone having the axis thereof in the same plane as the axis of said driver cone, said driven cone having the surface thereof at the position of closest association to the surface of said driver cone parallel thereto; shifting means, said shifting means having a traverse rod slidably connected to said base and in a plane parallel to said cone axis, said traverse rod being positioned so that the axis thereof bisects the gap between said driver cone and said driven cone, said traverse rod having a guide bushing and guide cap secured thereto; intermediate wheel means, said intermediate wheel means having a frictional wheel simultaneously engaging the surfaces of said driver cone and said driven cone, the peripheral face of said friction wheel having a greater diameter at the center thereof and tapering to a lesser diameter at the edges of said face; actuating means pivotally attached to said traverse rod so that a force may be applied thereto whereby the position of said traverse rod may be varied along the direction of its axis; clevis means provided with an elongated head and a yoke, said elongated head having an elongated aperture and being slidably secured therewith to said traverse rod of said shifting means in a plane normal thereto, said elongated head being slidably accommodated by said guide bushing and said guide cap, said yoke of said clevis having said friction wheel rotationally mounted therein, said yoke being canted at an angle so that said friction wheel will rotate in a plane normal to the axes of said cones, the angle of cant of said clevis yoke being equal to said angle of taper of said peripheral face of said friction wheel; spring means accommodated in said elongated aperture provided by said clevis head, said spring means having one end thereof abutting against said guide bushing secured to said traverse rod provided by said shifting means and the other end thereof abutting against an abutment face provided by the bottom wall of said elongated aperture thereby maintaining said intermediate wheel means in constant simultaneous contact with said surfaces of said cones; and a rotatable wheelhead operatively connected to said driven cone.

20. In a variable speed potter's wheel, the combination comprising: a horizontal base; a vertical base secured to said horizontal base; a driver cone rotatably secured to said vertical base, said driver cone having a truncated apex; a driven cone rotatably secured to said vertical base and spaced from said driver cone, said driven cone being inversely positioned adjacent said driver cone, the diameter of the larger end of said driven cone being greater than the truncated apex of said driver cone adjacent thereto, said driven cone having a truncated apex, said driven cone having the diameter of the truncated apex thereof equal to the diameter of said adjacent larger end of said driver cone; a friction wheel positioned in the gap between said cones, said friction wheel simultaneously engaging the surfaces of said cones, the peripheral face of said friction wheel having a greater diameter at the center thereof and tapering a lesser diameter at the edges of said face; a traverse rod, said traverse rod being slidably connected to said base and in a plane parallel to said cone axes, said traverse rod being positioned so that the axis thereof bisects the gap between said driver cone and said driven cone, said traverse rod having a guide bushing and guide cap secured thereto; actuating means pivotally attached to said traverse rod so that a force may be applied thereto whereby the position of said traverse rod may be varied along the direction of its axis; a clevis having an elongated head and yoke, said elongated head having an elongated aperture and being slidably secured therewith to said traverse rod in a plane normal thereto, said elongated head being slidably accommodated by said guide bushing and said guide cap, said yoke of said clevis having said friction wheel rotatably mounted therein, said yoke being canted at an angle so that said friction wheel will rotate in a plane normal to the axis of said cones, the angle of cant of said clevis yoke being equal to said angle of taper of said peripheral face of said friction wheel; a compression spring accommodated in said elongated aperture provided by said clevis head, said spring having one end thereof abutting against said guide bushing secured to said traverse rod and the other end thereof abutting against an abutment face provided by the bottom wall of said elongated aperture thereby maintaining said friction wheel in constant simultaneous contact with said surface of said cones; and a rotatable wheelhead operatively connected to said driven cone.

References Cited by the Examiner
UNITED STATES PATENTS

| | | | |
|---|---|---|---|
| 776,455 | 11/1904 | Christie | 74—193 |
| 1,116,373 | 11/1914 | Besserdich | 74—193 |
| 2,089,003 | 8/1937 | Sack | 74—193 |
| 2,611,038 | 9/1952 | Graham | 74—193 X |

DAVID J. WILLIAMOWSKY, *Primary Examiner.*

L. H. GERIN, *Assistant Examiner.*